Figure 1:
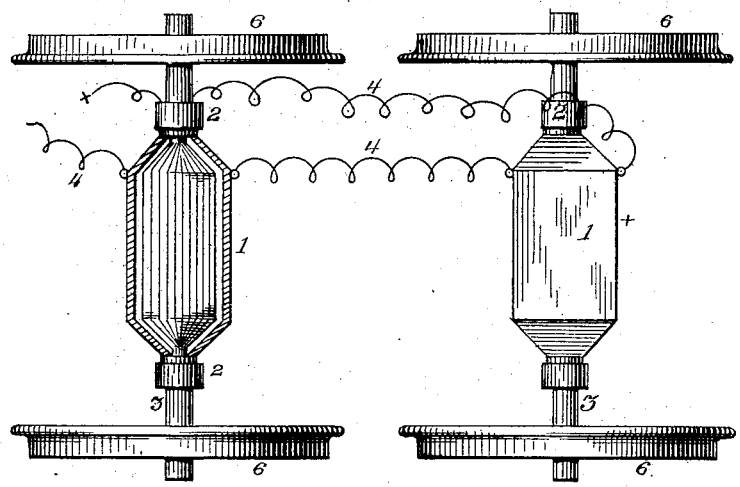

3 Sheets—Sheet 1.

O. LUGO.
Dynamo-Electric Brake.

No. 224,933. Patented Feb. 24, 1880.

3 Sheets—Sheet

O. LUGO.
Dynamo-Electric Brake.

No. 224,933. Patented Feb. 24, 1880.

Attest:
R. F. Barnes.
Martin Buell.

Inventor:
Orazio Lugo

3 Sheets—Sheet 3.

O. LUGO.
Dynamo-Electric Brake.

No. 224,933.  Patented Feb. 24, 1880.

Attest:
R. F. Barnes
Martin Buell

Inventor:
Orazio Lugo

UNITED STATES PATENT OFFICE.

ORAZIO LUGO, OF FLUSHING, NEW YORK.

DYNAMO-ELECTRIC BRAKE.

SPECIFICATION forming part of Letters Patent No. 224,933, dated February 24, 1880.

Application filed June 9, 1879.

*To all whom it may concern:*

Be it known that I, ORAZIO LUGO, of Flushing, county of Queens, State of New York, have invented a new and useful Improvement in Railroad and other Brakes, of which the following is a specification.

My invention relates especially to that class of brakes which are applied to retard and arrest the motion of a railroad-train, and also to other revolving bodies, such as centrifugal machines, &c.

All brakes thus far in use retard and stop the motion by causing diverse mechanical appliances to produce friction in bringing the brake in direct contact with the revolving wheels. The result is often a jarring and racking of the moving trains and an enormous wear and tear, which is very great when railroad-trains have to make frequent stoppages, as is the case with the New York elevated railways.

The purpose of my invention is to do away with contact or friction brakes altogether, and to retard or arrest the motion without any contact or friction whatsoever.

I use for that purpose the electric currents produced by modern dynamo-electric machines operated by the revolving axle of a locomotive, or by the revolving axles of the trucks of the cars, or by axles of other revolving machinery.

It is well known that when the circuit of a dynamo-electric machine is left open it can be moved without any perceptible amount of resistance, and that the resistance to the motion appears when the circuit is closed, becoming greater in proportion as the resistance in the conductors between the electrodes becomes less. Notwithstanding that this was known and dynamo-electric machines have been attached to railway-trains, it was never attempted to make use of this resistance as a substitute for friction-brakes, and the application has thus far been to use the electric current for the development of electro-magnetic attractions, which then were made to act mechanically upon the ordinary objectionable friction-brakes.

In place of making such a mechanical use of the current developed, I take advantage of the fact that the car-wheels and most other wheels are of iron or steel, and that electro-magnets placed very close to their circumference will, when charged, exert a retarding influence upon their motion. Therefore I conduct the current developed by the closing of the circuit through the coils of soft-iron electro-magnets placed along the rims and flanges of the wheels in motion. Their merely attractive action and the induced magnetism evolved in the moving wheels I find nearly as effective in retarding and arresting their motion as in an actual contact by friction, while I gain the important advantage of avoiding all wear and tear, which, in the case of railroad-trains, is a most important consideration, involving an expense which is only realized by those who have the charge to keep such cars in proper condition.

Figure 2:
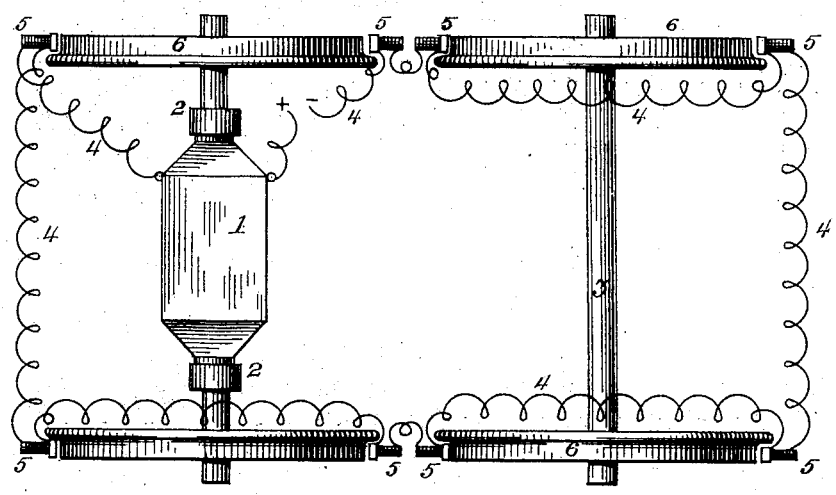
Figure 3:
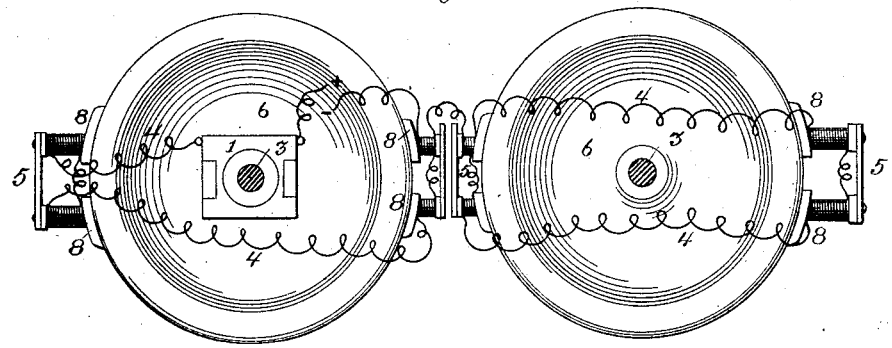
Figure 4:
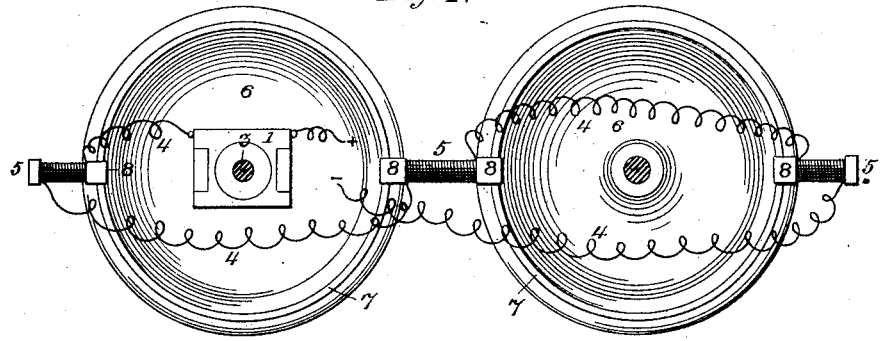
Figure 5:
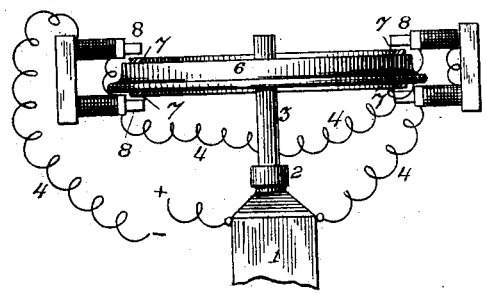
Figure 6:
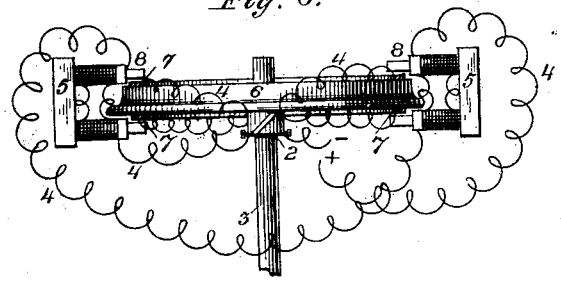

For further elucidation the accompanying drawings may serve, in which Figure 1 is a section of a railroad-truck, showing two electro-dynamic machines coupled together and fixed on two of the axles. Fig. 2 is a section of a railroad-truck, showing the relative position of dynamo-electric machines and electro-magnets to the wheels. Fig. 3 is a vertical section of Fig. 2. Fig. 4 is a vertical section of a railroad-truck, showing the relative position and connections with a dynamo-electric machine, electro-magnets, and metallic rings fastened to the circumference of the wheels. Fig. 5 is a top view of Fig. 4. Fig. 6 is a top view of one of the wheels of a railway-truck, showing the relative position of a commutator, electro-magnets, metallic rings or wires or bands, and their connections with conducting-wires.

1 are dynamo-electric machines, the cores or armatures of which are fastened to the axles of the trucks. The wires of the armature connect with commutators 2, also fastened to the axles. The electro-magnets of 1 are adjusted on the axle 3 with collars or journals, whereby the axles 3 are free to rotate while the electro-magnets are kept in position with rods or chains fastened to any convenient part of the body of the truck.

The wires of the revolving armature connect with commutator 2 and electro-magnet 1, from which the wires 4 connect either with one or more dynamo-electric machines or to electro-magnets 5, placed near the circumference of the wheels 6, and retained in position by being fastened to cross-bars or to the body of the truck.

The metallic rings or disks 7, (the disks or rings 7 can be made up either of solid copper or of copper wire,) which involve one of the most important features of my invention, are placed near the circumference of the wheels 6. The electro-magnets 5 have pieces of soft iron 8 in contact with their poles, which, when they become magnetic by induction, concentrate their magnetic inductive action on the surface of the metallic rings or disks 7. These rings or disks 7 project between the soft iron 8 of the electro-magnets 5. The rings 7 are connected by conductor 4 to commutator 2, and from the commutator to electro-magnets 5 to a terminus + and −.

When the wheels 6 or axles 3 are in motion and the termini + and − of the conducting-wire 4 are disconnected, no resistance is offered to the revolving or moving bodies, nor are electric currents developed; but as soon as the termini + and − are connected a circuit is formed and electric dynamo currents generated, which offer immediate resistance to the revolving or moving wheel 6 or axles 3, and the train is finally brought to a stop.

I may also, in some cases, use an independent electro-dynamo machine placed on the locomotive or on any cars of the train, and worked either by hand, small donkey-engine, or any other power, for the purpose of producing an induced current, which I conduct by wires to the wires connected with the electro-magnets, placed as described above.

In a few isolated cases, when trains have to remain stationary on very steep grades, either down or upward, I may use brake-shoes pressed against the periphery of the wheels, for the object of keeping the trains stationary.

It is, of course, understood that my diverse devices applied to railroad-axles, as shown in the accompanying drawings, can be used for retarding and stopping any other revolving axles set in motion by power, such as centrifugal machines, the axles of steam-engines, horse-cars, looms, &c.

Other currents besides those developed by dynamo-electric machines—such as galvanic currents—might be employed; but I have tested and prefer dynamo-electricity.

I disclaim as a discovery that dynamo-electric machines offer a resistance to the power moving them proportional to the conductibility of the material used for the discharge of the current, as this has been known for some time.

I also disclaim the use of such currents or any other electric currents for the operation of friction-brakes, disclaiming their use altogether; but

What I claim as my invention is—

1. The method of retarding or arresting revolving machinery, especially railroad-trains, by the application of the internal resistance to motion offered by dynamo-electric machines when the circuit is closed by conductors.

2. The method of retarding or arresting the motion of machinery of iron or steel by the action of dynamo-electric or voltaic currents, acting through the intervention of magnetic attraction without contact, substantially as described.

ORAZIO LUGO.

Witnesses:
S. M. POOL,
GEO. R. BYINGTON.